United States Patent [19]

Dumbauld et al.

[11] Patent Number: 4,823,386

[45] Date of Patent: * Apr. 18, 1989

[54] ADDRESSABLE SUBSCRIBER CABLE TELEVISION SYSTEM

[75] Inventors: Lewis D. Dumbauld, Phoenix, Ariz.; Gilbert L. Tash, San Clemente, Calif.

[73] Assignee: Texscan Corporation, Scottsdale, Ariz.

[*] Notice: The portion of the term of this patent subsequent to Oct. 2, 2001 has been disclaimed.

[21] Appl. No.: 57,675

[22] Filed: May 27, 1987

Related U.S. Application Data

[63] Continuation of Ser. No. 827,485, Feb. 6, 1986, abandoned, which is a continuation of Ser. No. 636,847, Aug. 1, 1984, abandoned, which is a continuation of Ser. No. 250,215, Apr. 2, 1981, Pat. No. 4,475,123.

[51] Int. Cl.$^4$ .............................................. H04N 7/167
[52] U.S. Cl. ........................................ 380/13; 380/20; 358/86
[58] Field of Search ....................... 380/13, 20; 358/86

[56] References Cited

U.S. PATENT DOCUMENTS

| | | | |
|---|---|---|---|
| 3,230,302 | 1/1966 | Bruck et al. | 358/84 |
| 3,244,809 | 4/1966 | Fuller et al. | 358/86 |
| 3,668,307 | 6/1972 | Face et al. | 358/114 |
| 3,751,670 | 8/1973 | Grodner et al. | 455/607 |
| 3,786,424 | 1/1974 | McVoy et al. | 358/86 |
| 3,801,735 | 4/1974 | Gabriel | 358/86 |
| 3,886,302 | 5/1975 | Kosco | 358/114 |
| 3,943,447 | 3/1976 | Shomo | 455/4 |
| 3,987,240 | 10/1976 | Schultz | 455/6 |
| 3,990,012 | 11/1976 | Karnes | 455/2 |
| 4,135,157 | 1/1979 | Toonder | 358/86 |
| 4,268,860 | 5/1981 | Blonder | 358/114 |
| 4,313,132 | 1/1982 | Doles et al. | 358/114 |
| 4,314,375 | 2/1982 | Belisomi | 455/160 |
| 4,331,974 | 5/1982 | Cogswell et al. | 358/84 |
| 4,355,415 | 10/1982 | George et al. | 455/185 |

Primary Examiner—Stephen C. Buczinski
Attorney, Agent, or Firm—Woodard, Emhardt, Naughton, Moriarty & McNett

[57] ABSTRACT

An addressable cable television system includes a transmission cable for transmitting a plurality of television signals driven onto the cable from a head end thereof and a plurality of multiple subscriber controllers coupled to the cable for controlling reception of television signals by a plurality of subscribers associated with each of the multiple subscriber controllers. Each of the multiple subscriber controllers includes a plurality of programmable frequency converters, each of which is coupled by a drop cable to the antenna of a television receiver within the subscriber's home. Authorization signals are transmitted from the head end of the cable to the plurality of multiple subscriber controllers for indicating which of the plurality of television signals a particular subscriber is authorized to receive. Each subscriber is provided with channel request circuitry for transmitting a channel request over the drop cable to the associated multiple subscriber controller. Upon receiving a request from a subscriber for access to a television signal, the associated controller compares the channel requested to those channels for which the subscriber is authorized to receive. If the requested channel is authorized, the frequency converter for the particular subscriber is programmed by the controller to provide the subscriber with the requested channel. All frequency converters are located remote from the associated subscriber and receive electrical power from the associated subscriber's home via the drop cable.

11 Claims, 5 Drawing Sheets

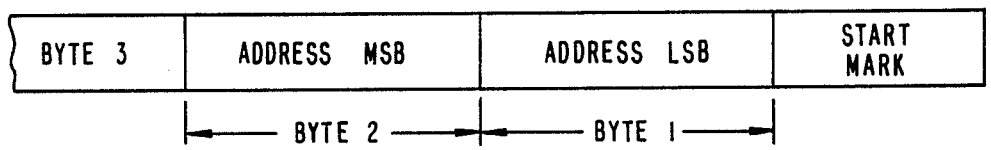
Fig.5
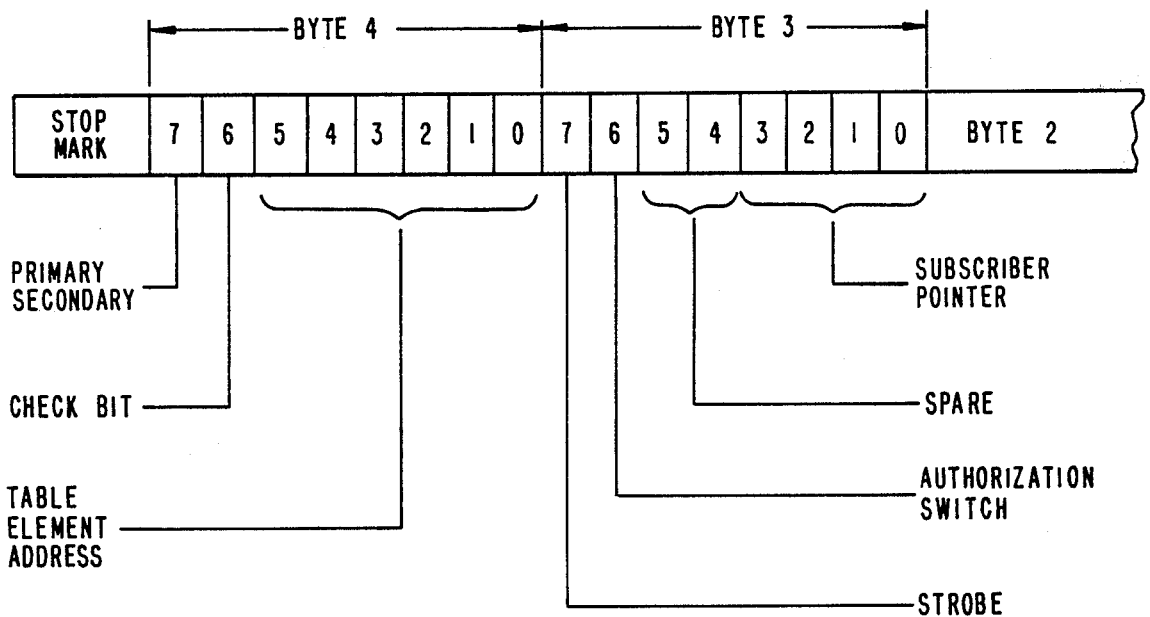
Fig.6
Fig.7

ADDRESSABLE SUBSCRIBER CABLE TELEVISION SYSTEM

This application is a continuation of application Ser. No. 827,485, filed Feb. 6, 1986, now abandoned, which is a continuation of application Ser. No. 636,847, filed Aug. 1, 1984, now abandoned, which is a continuation of application Ser. No. 250,215, filed Apr. 2, 1981 now U.S. Pat. No. 4,475,123.

BACKGROUND OF THE INVENTION

1. Field of the Invention

The present invention relates generally to cable television systems, and more particularly, to a cable television system wherein each subscriber can be individually addressed for determining which television signals the subscriber is authorized to receive.

2. Description of the Prior Art

Cable television systems are becoming increasingly popular, due in part to the fact that viewers are willing to pay a service fee for being able to receive special programs and features not available from networks that broadcast over the air waves. The relatively large number of channels which may be simultaneously transmitted over a cable television system allows for a wide variety of programming. Not all subscribers are interested in or willing to pay for receiving all of the television programs on each of the transmitted channels. Accordingly, a desirable feature of a cable television system is the ability to provide subscribers with different levels of service for which correspondingly different service fees are charged. Apparatus is known for enabling particular subscribers to obtain basic cable service b prohibit reception of premium channel programs; however, such apparatus typically requires the installation of blocking filter devices at the home of the subscriber who does not wish to receive the premium channel programs. Apparatus of this type is expensive and is circumvented relatively easily by the subscriber. More sophisticated schemes for controlling reception of the premium channels involve electronically scrambling the composite television signal for making it unintelligible when received by subscribers who have not paid to have special descrambling equipment installed. Electronic scrambling, though effective, is expensive and degrades the quality of the received television signal. Cable television networks are sometimes used to transmit live coverage of certain one-time features, such as sporting events. If there were a convenient way for the operator of the cable television network to selectively allow requesting subscribers to access the special feature, then an additional premium could be charged to such requesting subscribers, including those subscribers who have already paid for receiving all normally available television programming.

When a subscriber falls behind in his payments for receiving cable television signals, the only means available to the cable television system operator for discontinuing service to the unpaying subscriber is to physically disconnect the coaxial drop cable that enters the subscriber's home from the cable television network. This procedure obviously requires that a service man be dispatched to the delinquent subscriber's home, at the expense of the cable television network operator.

Known cable systems typically offer a number of channels in excess of the twelve channels in the VHF wave band received by conventional television receivers Accordingly, subscribers to cable television systems are often provided with a frequency converter for allowing their standard television receivers to utilize and present all of the channels transmitted on the cable. The frequency converter is usually installed adjacent the subscriber's television receiver and is coupled between the drop cable entering the subscriber's home and the antenna of the television receiver Because these frequency converters are located within the homes of the subscribers, the frequency converters are often subject to damage and even theft. Also, since the frequency converter is located within the subscriber's home, it is necessary to transmit television signals having relatively high carrier frequencies over the drop cable to the subscriber's home. Signal losses in the drop cable are significant at these higher frequencies and thereby limit the maximum practical length for which such drop cables may extend. Since the length of the drop cables must be kept relatively short, the number of distribution points along the cable at which such drop cables are coupled is relatively large.

Accordingly, it is an object of the present invention to provide a cable television system for transmitting a plurality of television signals and having a plurality of subscribers wherein the operator of the cable television system may conveniently and inexpensively control the television signals which may be received by each of the subscribers.

It is another object of the present invention to provide a cable television system which may be utilized to transmit premium television signals for which each subscriber must pay a premium in addition to his normal service fee and wherein the operator of the cable television system can conveniently and inexpensively allow subscribers who have paid the additional premium to receive the premium television signals.

It is still another object of the present invention to provide a cable television system wherein the frequency converter associated with each particular subscriber is in a secure location inaccessible by the subscriber or others.

It is a further object of the present invention to provide a cable television system wherein a plurality of such frequency converters can be disposed in a single secure location.

It is a still further object of the present invention to provide a cable television system which offers a relatively large number of different channels while avoiding the necessity to transmit relatively high carrier frequencies over drop cables extending to the subscriber's home.

It is yet another object of the present invention to provide a cable television system wherein the length of subscriber drop cables can be extended in order to minimize the number of subscriber distribution points along the cable.

It is still a further object of the present invention to provide a cable transmission system utilizing frequency converters for converting television signals transmitted by the cable to frequencies which may be utilized by the subscriber's television receiver wherein the frequency converters are located remote from the subscriber's home and wherein the power drain from the transmission cable is minimized when powering such remotely located frequency converters.

These and other objects of the present invention will become apparent to those skilled in the art as the description thereof proceeds.

SUMMARY OF THE INVENTION

Briefly described, and in accordance with one embodiment thereof, the present invention relates to a cable television system for distributing a plurality of different television channel signals to a plurality of subscribers, the cable television system including a transmission cable for transmitting a plurality of different television signals to a plurality of subscribers, and an authorization encoder coupled to the head end of the transmission cable for generating authorization signals transmitted over the transmission cable. A plurality of controllers are coupled to the transmission cable and are responsive to the authorization signals for controlling the reception of television channel signals by the plurality of subscribers. The authorization signals generated by the authorization encoder each include an address portion for identifying a particular subscriber and a data portion for indicating which television channel signals the particular subscriber has been authorized to receive.

Each subscriber is associated with a particular controller. Each controller responds to authorization signals having an address portion that identifies a subscriber associated with the particular controller by storing the data portion of such authorization signals. Each subscriber has a channel selection mechanism coupled to the associated controller for generating a selection request signal indicating which television channel signal the subscriber desires to receive. When a subscriber requests a particular television channel signal, the associated controller compares the selection request signal received from the associated subscriber to the stored data portion of the corresponding authorization signal for determining whether the subscriber may receive the selected television channel signal. Associated with each subscriber is a frequency converter for converting the selected television channel to a predetermined low frequency signal in the VHF wave band for utilization by the subscriber's television receiver. If the television channel signal selected by the subscriber is one which the subscriber is authorized to receive, then the controller associate with the particular subscriber programs the associated frequency converter to deliver the selected television channel signal to the subscriber.

In the preferred embodiment of the present invention, each controller is associated with a plurality of subscribers and is responsive to authorization signals having address portions corresponding to any of its associated plurality of subscribers. Each multiple subscriber controller is coupled to each of the frequency converters associated with the particular plurality of subscribers associated with the controller.

Each of the frequency converters is located remote from its associated subscriber and, preferably, all of the frequency converters associated with a particular controller are located in a common location along with the controller. Each remotely located frequency converter is coupled to its associated subscriber by a drop cable which couples the selected television signal to the subscriber. In addition, each drop cable conducts electrical power from the subscriber's home to the frequency converter associated with the subscriber for powering the frequency converter. The drop cable also couples selection request signals from the subscriber's channel selection mechanism to the associated controller.

In the preferred embodiment of the present invention, each of the controllers includes a clocked microprocessor, and a clock generator is coupled to the head end of the transmission cable for causing a common clock signal to be transmitted over the transmission cable to each of the microprocessors for synchronizing all of the controllers.

In order to simultaneously authorize a large number of subscribers to access a premium channel, the authorization encoder may be utilized to cause preauthorization signals to be transmitted over the transmission cable, such preauthorization signals including an address portion for identifying a particular subscriber and a data portion for indicating whether or not the subscriber has been preauthorized to receive a premium television program. In addition, a master strobe generator is coupled to the head end of the transmission cable for generating a master strobe signal immediately prior to transmission of the premium television program. Each of the controllers responds to preauthorization signals having an address portion corresponding to an associated subscriber by storing the data portion of such preauthorization signals. Each of the controllers is also responsive to the master strobe signal for allowing associated subscribers to then access the premium television program provided that the stored data portion of the preauthorization signal for that subscriber indicates that the particular subscriber has been preauthorized to receive the premium television program.

BRIEF DESCRIPTION OF THE DRAWINGS

FIGS. 5-7 illustrate the format of authorization signals transmitted from the head end in one embodiment of the invention.

DETAILED DESCRIPTION OF THE PREFERRED EMBODIMENT

Figure 1:
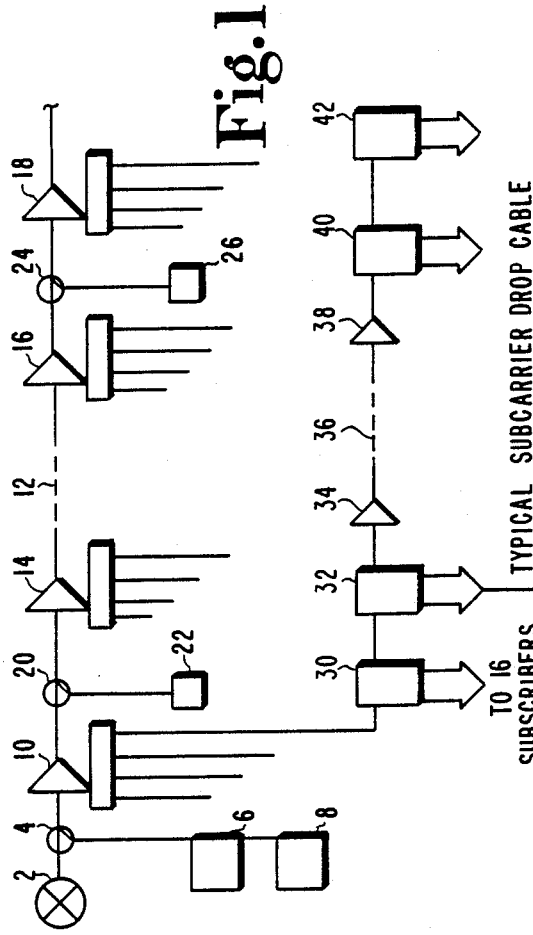
FIG. 1 is a block diagram of a transmission cable distribution network servicing a plurality of subscribers and including a drop cable and code translator associated with a particular one of the plurality of subscribers.

In FIG. 1, a cable television transmission system is illustrated of the type which may be utilized in conjunction with the present invention. The cable transmission system includes a head end 2 corresponding to the starting or transmitting end of the cable television system and including electronic equipment such as antennas, preamplifiers, frequency converters, modulators, demodulators and related equipment for generating a plurality of different television channel signals to be transmitted over the transmission cable. Typically, such television channel signals are transmitted by carrier waves within a frequency range of approximately 55.25 Megahertz to 397.25 Megahertz.

A coupler 4 is connected to the output of head end 2 for coupling an encoder/transmitter 6 thereto. Encoder/transmitter generates a clocking signal encoded as a predetermined frequency for distribution over the transmission cable. In the preferred embodiment of the present invention, the clocking signal is transmitted as a 60 Megahertz frequency signal. Encoder/transmitter 6 also generates authorization signals and/or preauthorization signals in a serial, encoded manner to be described more fully below for distribution over the transmission cable. In the preferred embodiment of the invention, a computer 8 is coupled to encoder/transmitter 6 for determining the authorization signals and preauthorization signals generated by encoder/transmitter 6. As will become apparent as the present description proceeds, the authorization signals and preauthorization signals generated by encoder/transmitter 6 determine which of the plurality of television channel signals transmitted over the cable may be received by each individual cable television subscriber. Computer 8 may be used to maintain records of payments received from subscribers and to control encoder/transmitter 6 in accordance therewith, thereby determining the level of service to be provided to each individual subscriber.

Coupled to the main trunk 12 of the transmission cable are a series of bridging amplifiers 10, 14, 16 and 18 each of which serves as a high-class tap providing isolation from main trunk 12 and providing multiple high-level outputs for driving feeder lines. Interspersed between adjacent bridging amplifiers are capacitive couplers such as 20 and 24 which effect a low frequency interruption of the transmission cable without impeding the transmission of higher frequencies thereacross. Couplers 20 and 24 each have associated power supplies 22 and 26, respectively, connected thereto for supplying electrical power to a portion of the cable in order to power the amplifiers coupled to that portion of the cable. Each power supply imposes a 60 volt/60 cycle alternating current power signal onto the portion of the cable to which it is coupled. Couplers 20 and 24 serve to isolate portions of the cable powered by different power supplies. Power supplies 22 and 26 are each used to supply power to a portion of the cable approximately one mile in length. Where power drain on the cable is increased by adding additional loading, the length of each individually powered portion of the cable necessarily decreases, thereby requiring a greater overall number of separate power supplies for powering a given cable system. Thus, any reduction in the power drain from the cable effectively reduces the cost and complexity of the cable television transmission system.

Referring again to bridging amplifier 10 in FIG. 1, a plurality of feeder lines propagate from bridging amplifier 10, one of such feeder lines being designated 28. Coupled to feeder line 28 are a plurality of multiple subscriber controller boxes, such as 30 and 32, each of which services sixteen subscribers in the preferred embodiment of the present invention. Periodically, the signals transmitted by the feeder line are boosted by line extender/distribution amplifiers such as 34 for extending feeder line 28 as designated by dashed lines 36. At the end of the feeder line, an additional amplifier 38 again boosts the transmitted signals for the multiple subscriber controller boxes 40 and 42 at the end of the feeder line. The circuitry comprising bridging amplifier 10 and line extender/distribution amplifier 34 is well known to those skilled in the art and is described in detail in "CATV Circuit Engineering" by William A. Rheinfelder, TAB Books, 1975.

One of the sixteen subscriber drop cables propagating from multiple subscriber controller box 32 is shown as drop cable 44 in FIG. 1. Drop cable 44 extends from multiple subscriber controller box 32 to a code translator box 46 typically disposed above the subscriber's television receiver 47 within the subscriber's home. Code translator box 46 has a line 48 coupled to the antenna of television receiver 47 for coupling a selected television channel signal from drop cable 44 thereto. Code translator box 46 also includes a pair of lines 50 coupled to a power supply box 52 for receiving electrical power therefrom. As will be explained in further detail below, a portion of the electrical power supplied from power supply box 52 is transmitted over drop cable 44 to channel selection circuitry within multiple subscriber controller box 32. Power supply box 52 includes three prongs adapted to engage a conventional grounded wall socket 56 within the subscriber's home for receiving electrical power therefrom. Power supply box 52 also includes a socket for receiving power cord 54 of television receiver 47. Within power supply box 52, an optical isolator is coupled to the control input of a triac circuit for selectively coupling power cord 54 to electrical power. A pair of lines 76 extend from the optical isolator within power supply box 52 to code translator box 46. A hand-held terminal 58 is ultrasonically linked to code translator box 46 for turning television receiver 47 on and off and for selecting the television channel displayed thereby.

Figure 2:
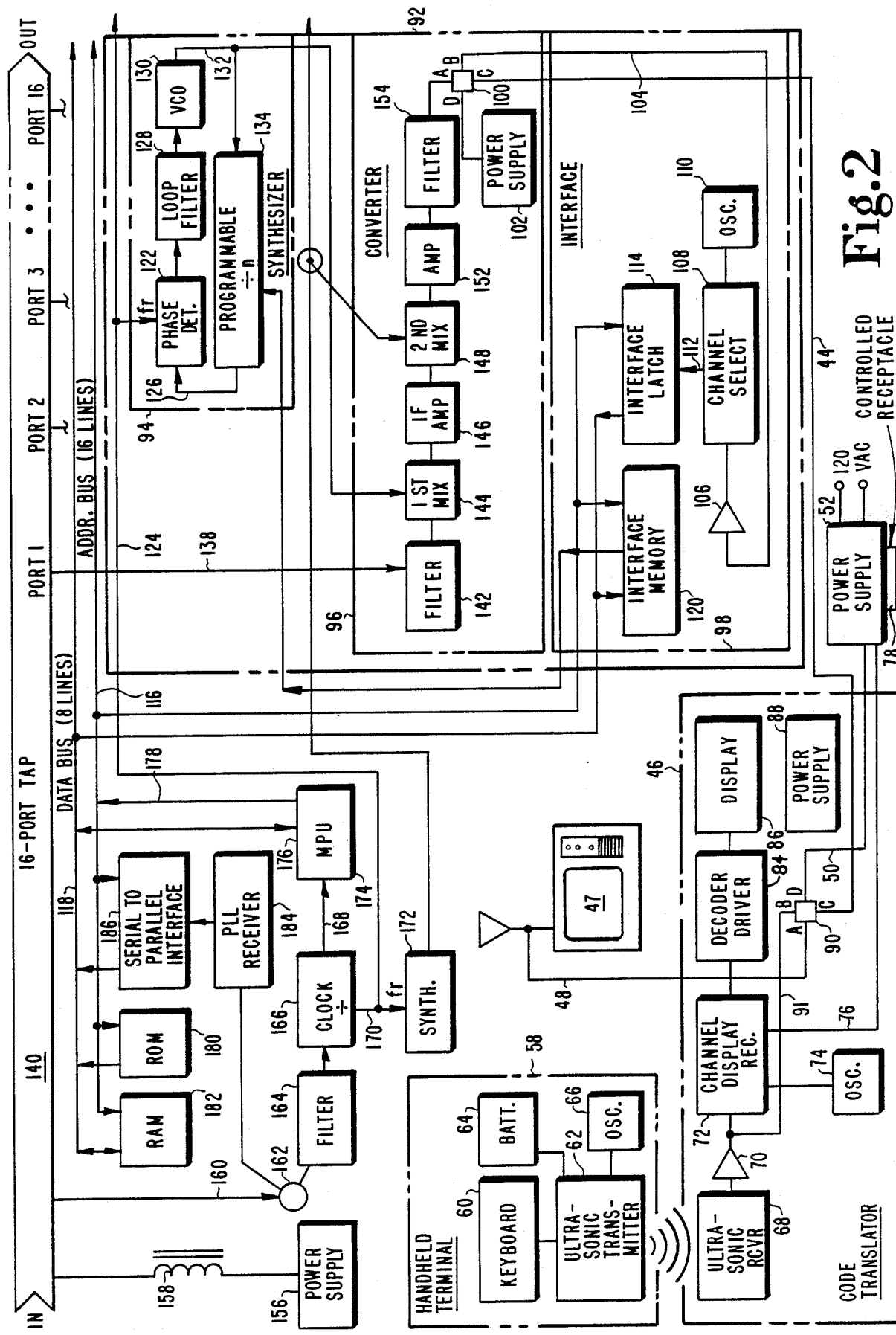
FIG. 2 is a block diagram of a multiple subscriber controller, one of sixteen frequency converters controlled by the controller, and the hand-held terminal and code translator coupled to the illustrated frequency converter.

FIG. 2 illustrates in further detail the internal components associated with multiple subscriber controller box 32, code translator 46, and hand-held terminal 58 shown in FIG. 1. Hand-held terminal 58 includes a keyboard 60 which preferably includes twenty key pads arranged in a matrix of five rows and four columns. Ten of the key pads correspond to the digits 0-9. Other key pads are used for turning the television receiver off, for making fine tuning adjustments, and for increasing and decreasing the volume of the audio portion of the program being received. Depressing any of the above mentioned key pads causes one row and one column of keyboard 60 to be coupled to ground. The five row and four column lines of keyboard 60 are coupled to an ultrasonic transmitter integrated circuit chip such as the MC14457 CMOS chip commercially available from Motolola, Inc. A 9 volt battery 64 is provided within hand-held terminal 58 for supplying electrical power to ultrasonic transmitter chip 62. An oscillator 66, which may include either a ceramic resonator or crystal, is coupled to ultrasonic transmitter chip 62 for providing a 500 kHz signal thereto. Ultrasonic transmitter chip 62 divides the 500 kHz signal by either twelve or thirteen for providing frequencies of 41.67 kHz or 38.46 kHz, respectively An ultrasonic ceramic microphone (not shown) of the type commercially available from Matsushita Electric Industrial Company, Ltd. of Japan, is coupled to the output of ultrasonic transmitter chip 62 for converting the electrical signals generated thereby to ultrasonic waves. Row and column information received by ultrasonic transmitter 62 from keyboard 60 is encoded into a five-bit word. This five-bit word, proceeded by two bits, "0" and "1", is used in sequence to control the divide by twelve/divide by 13 divider, and, consequently, the frequency-modulated bit pattern transmitted from ultrasonic transmitter 62.

The ultrasonic waves transmitted by ultrasonic transmitter 62 are received by code translator 46. Within code translator 46 is an ultrasonic ceramic microphone 68 responsive to the ultrasonic waves transmitted by the hand-held terminal The output of ultrasonic ceramic microphone 68 is amplified by a conventional wide-band amplifier 70, such as Motorola part type MC3310.

The output of amplifier 70 is coupled to an ultrasonci receiver integrated circuit chip 72 such as Motorola part ypte MC14458. Though not shown in FIG. 2, four series-connected inverting gates may be inserted between the output of amplifier 70 and the data input of receiver chip 72 in order to pulse shape the incoming signal. A 500 kHz oscillator 74 is coupled to receiver chip 72 for providing a 500 kHz square wave reference signal thereto. Receiver chip 72 is adapted to convert the frequency-modulated serial bit stream received from ultrasonic transmitter 62 to a five bit data word. Assuming that the subscriber has depressed a key pad on his hand-held terminal corresponding to a digit 0–9, then receiver chip 72 latches four of the five bits which corresponds to the particular digit selected. On the other hand, if the subscriber has depressed a key pad in order to turn the television receiver off, to adjust fine tuning, or to control volume, then receiver chip 72 is responsive to the transmitted bit stream for activating various outputs coupled to television receiver 47 for turning the set off, adjusting the tuning, or modifying the volume, accordingly. Receiver chip 72 is adapted to latch a pair of four-bit data words transmitted by ultrasonic transmitter 62 in order to store a two-digit representation of the television channel to be selected. Thus, the subscriber may select one of ninety-nine different channels ranging from channel 01 to channel 99.

In addition, one output pin of receiver chip 72 is a high level whenever the subscriber has selected a channel but is driven to a low level whenever the subscriber depresses the key pad on his hand-held terminal corresponding to a command for turning the receiver 47 off. This output pin and ground are coupled by lines 76 to power supply box 52 for actuating the optical isolator therein in order to selectively couple controlled receptacle 78 to the 120 volt alternating current power signal received by power supply box 52. The triac circuit within power supply box 52 is responsive to the optical isolator for selectively coupling or uncoupling receptacle 78 to electrical power. As mentioned above, the power cord 54 of television receiver may be plugged into this controlled receptacle for turning the television receiver on and off.

Power supply box 52 also includes a transformer for receiving a 110 volt, 60 Hertz, alternating current signal and converting it to a 16 volt, 60 Hertz, alternating current signal. The 16 volt alternating current signal is coupled by a pair of lines 50 to the input of direct current power supply 88 which provides direct current voltages for powering the components within code translator 46.

In one embodiment of the present invention illustrated in FIG. 2, the two four-bit data words latched by receiver chip 72 are coupled directly to decoder/driver circuit 84 for driving a two digit, seven segment display 86 in order to display the two digit channel selected by the subscriber via his hand-held terminal 58. Decoder/river 84 may be of the type commercially available from Motorola, Inc. under designated part type MC14511B. In an alternate embodiment of the present invention to be described below, a full duplex mode of operation is implemented whereby the digits displayed by display 86 are not taken directly from receiver chip 72 but are instead derived from the multiple subscriber controller associated with the particular subscriber.

Also included within code translator 46 is a coupling box 90 to which subscriber drop cable 44 is directly coupled. The output of wide band amplifier 70 is coupled by line 92 to coupling box 90. Within coupling box 90, line 91 is coupled by a 25 microhenry inductor and a 015 microfarad capacitor (not shown) connected in series to drop cable 44 in order to transmit the frequency-modulated bit stream received by ultrasonic microphone 68 over drop cable 44 to the multiple subscriber controller box. Power supply lines are also coupled to coupling box 90 wherein one of lines 50 is coupled to the ground sheath of drop cable 44 and the other is coupled by a 20 milihenry inductor (not shown) to the signal conductor of drop cable 44 for coupling the 16 volt alternating current power signal thereto. Transmission of electrical power over drop cable 44 in the form of alternating current avoids electrolysis problems which might otherwise result were direct current power transmitted to remote circuitry. Additionally, line 48 couples the antenna of television receiver 47 to coupling box 90 wherein a 0.001 microfarad capacitor (not shown couples line 48 to subscriber drop cable 44 in order to receive television signals therefrom.

Subscriber drop cable 44 extends from the subscriber's code translator 46 to remote channel selection circuitry associated with the particular subscriber and designated by dashed block 92. In the preferred embodiment of the present invention, sixteen such channel selection circuit blocks for sixteen different subscribers are located in a common multiple subscriber controller box containing the controller associated with the particular group of sixteen subscribers. The multiple subscriber controller box may be either located on a strand for aerial installation type systems or in an underground vault for underground installation type systems. In either case, the controller and associated frequency converters are in a secure location remote from the subscribers, vandals and thieves.

Still referring to FIG. 2, channel selection block 92 includes three subcircuits including a frequency synthesizer g within dashed block 94, a frequency converter within dashed block 96, and an interface circuit within dashed block 98. Channel selection circuitry 92 utilizes a double conversion technique wherein the broad band signal transmitted by the cable television system, ranging from 55.25 megahertz to 397.25 megahertz, is mixed with a synthesized frequency in the range of 434.5 megahertz to 776.5 megahertz, resulting in a fixed IF difference frequency of 379.25 megahertz. The resulting IF frequency is then mixed with a fixed 434.5 Megahertz synthesized frequency, resulting in a fixed output difference frequency of 55.25 Megahertz, corresponding to channel 2 within the VHF wave band. In some regions, the off-the-air broadcast signal for channel 2 is strong, in which case the conversion scheme may be modified to convert the resulting output frequency to 61.25 Megahertz, corresponding to the frequency of channel 3 in the VHF wave band. As mentioned above, by transmitting all television channel signals over the subscriber drop cable 44 at a relatively low frequency in the VHF band, signal losses in the drop cable are maintained at a minimum, allowing the drop cables to be made much longer. As the length of the subscriber drop cables is increased, the number of subscribers which can share a common tap point off of the transmission cable also is increased.

Within channel selection circuitry 92 shown in FIG. 2, subscriber drop cable 44 terminates at coupler box 100. The 16 volt, 60 Hertz alternating current power supply voltage conducted by the central conductor of subscriber drop cable 44 is coupled through a twenty millihenry inductor to the input of direct current power supply 102. A second input of power supply 102 is coupled to the ground sheath of drop cable 44. Power supply 102 provides a direct current voltage for powering each of the components within channel selection circuitry 92. Coupling box 100 also couples subscriber drop cable 44 through a 25 microhenry inductor and a 0.5 microfarad capacitor connected in series to line 104 which, in turn, is coupled to the input of a wide band amplifier 106 such as part type MC3310 commercially available from Motorola, Inc. The output of amplifier 106 is coupled to the data input of ultrasonic receiver integrated circuit chip 108 which may be of the type commercially available from Motorola, Inc. under part designation MC14458 and identical to receiver circuit 72 used within code translator 46. Although not shown in FIG. 2, four series connected inverting gates may be inserted between the output of amplifier 106 and the data input of receiver chip 108 in order to pulse shape the frequency modulated bit stream amplified by amplifier 106. A free running oscillator 110, similar to oscillator 74 within code translator 46, provides a 500 kHz signal to receiver chip 108. Receiver chip 108 is responsive to the frequency modulated bit stream received by amplifier 106 for latching two four bit words corresponding to the two-digit channel selection made by the subscriber via his hand held terminal 58.

The two four-bit words latched by receiver chip 108 are coupled by lines 112 to the input of eight-bit interface latch 114. Interface latch 114 is coupled to a sixteen bit address bus 116 controlled by a multiple subscriber controller described in further detail below. In response to a particular address applied to address bus 116, interface latch 114 causes its eight-bit contents to be driven onto an eight-bit data bus 118 which communicates with the multiple subscriber controller.

Interface circuit 98 also includes an interface memory register 120 which, in the preferred embodiment of the present invention, is eleven bits wide. Interface memory register 120 is coupled to address bus 116 and is responsive to two particular addresses applied thereto by the multiple subscriber controller. Upon recognizing the first of the two particular addresses, interface memory register 120 stores the eight-bit data word on data bus 118 within the eight least significant bits thereof. Upon recognizing the second of the particular addresses, interface memory register 120 stores the three least significant bits applied to data bus 118 within the three most significant bits thereof.

After addressing interface latch 114, the multiple subscriber controller determines, in a manner to be described below, whether the two-digit channel selected by the subscriber is one which he is authorized to receive. Assuming that the selected channel is one which the subscriber is authorized to receive, the multiple subscriber controller obtains an appropriate N value from a lookup table in a manner to be described in further detail below. The eleven-bit N value is then stored within interface memory register 120 for programming frequency synthesizer circuit 94.

Still referring to FIG. 2, frequency synthesizer circuit 94 includes a phase detector block 122 having a first input 124 for receiving a reference frequency which, in the preferred embodiment of the present invention is 500 kHz. Phase detector block 122 also includes a second input 126 for receiving a divided frequency signal. The output of phase detector block 12 is coupled to the input of a filter network 128 for generating a direct current control voltage. The control voltage generated by filter 128 is applied to the control input of a voltage controlled oscillator 130. In response to the control voltage applied thereto, voltage controlled oscillator 130 generates a particular output frequency. The clocking input of a programmable divider 134 is coupled to output line 132 for receiving the output frequency signal generated by voltage controlled oscillator 130. Programmable divider 134 has its output coupled to input 126 of phase detector 122 for supplying the divided frequency signal thereto, the frequency of which is equal to the frequency of the output signal provided by voltage controlled oscillator 130 divided by a programmable eleven-bit value N. The eleven bit N value is supplied to input lines 136 by the output of interface memory register 120. Phase detector 122 and loop filter 128 may be formed by an integrated circuit of the type commercially available from Motorola, Inc. under part designation MC145155P. Programmable divider 134 may be of the type commercially available from Motorola, Inc. under part designation MC12071P.

Frequency synthesizer 94 functions to synthesize a frequency at the output of voltage controlled oscillator 130 which is a multiple N of the reference frequency received at input 124 of phase detector 122. In the preferred embodiment of the present invention, programmable divider 134 is adapted to divide by N in the range of 869 to 1553. As an example, if the subscriber desires to receive channel 2 (the lowest channel in the VHF band), then the multiple subscriber controller causes interface memory register 120 to store the value 869. Frequency synthesizer 94 effectively multiplies the 500 kHz reference frequency by 869 to provide a synthesized frequency of 434.5 Megahertz at the output of voltage controlled oscillator 130. Table I below lists the carrier frequencies for each of the channels conducted by the cable television system, the N value associated with each such channel and the resulting frequency (SYNTH #1) synthesized at the output of voltage controlled oscillator 130.

TABLE I

| | (all frequencies in Megahertz) | | |
|---|---|---|---|
| CH # | VIDEO CARR | SYNTH #1 | N FR = 500 KH |
| 2 | 55.25 | 434.5 | 869 |
| 3 | 61.25 | 440.5 | 881 |
| 4 | 67.25 | 446.5 | 893 |
| 5 | 77.25 | 456.5 | 913 |
| 6 | 83.25 | 462.5 | 925 |
| A(14) | 121.25 | 500.5 | 1001 |
| B(15) | 127.25 | 506.5 | 1013 |
| C(16) | 133.25 | 512.5 | 1025 |
| D(17) | 139.25 | 518.5 | 1037 |
| E(18) | 145.25 | 524.5 | 1049 |
| F(19) | 151.25 | 530.5 | 1061 |
| G(20) | 157.25 | 536.5 | 1073 |
| H(21) | 163.25 | 542.5 | 1085 |
| I(22) | 169.25 | 548.5 | 1097 |
| 7 | 175.25 | 554.5 | 1109 |
| 8 | 181.25 | 560.5 | 1121 |
| 9 | 187.25 | 566.5 | 1133 |
| 10 | 193.25 | 572.5 | 1145 |
| 11 | 199.25 | 578.5 | 1157 |
| 12 | 205.25 | 584.5 | 1169 |
| 13 | 211.25 | 590.5 | 1181 |
| J(23) | 217.25 | 596.5 | 1193 |
| K(24) | 223.25 | 602.5 | 1205 |
| L(25) | 229.25 | 608.5 | 1217 |
| M(26) | 235.25 | 614.5 | 1229 |
| N(27) | 241.25 | 620.5 | 1241 |
| O(28) | 247.25 | 626.5 | 1253 |
| P(29) | 253.25 | 632.5 | 1265 |

TABLE I-continued (all frequencies in Megahertz)

| CH # | VIDEO CARR | SYNTH #1 | N<br>FR = 500 KH |
|---|---|---|---|
| Q(30) | 259.25 | 638.5 | 1277 |
| R(31) | 265.25 | 644.5 | 1289 |
| S(32) | 271.25 | 650.5 | 1301 |
| T(33) | 277.25 | 656.5 | 1313 |
| U(34) | 283.25 | 662.5 | 1325 |
| V(35) | 289.25 | 668.5 | 1337 |
| W(36) | 295.25 | 674.5 | 1349 |
| X(37) | 301.25 | 680.5 | 1361 |
| Y(38) | 307.25 | 686.5 | 1373 |
| Z(39) | 313.25 | 692.5 | 1385 |
| AA(40) | 319.25 | 698.5 | 1397 |
| BB(41) | 325.25 | 704.5 | 1409 |
| CC(42) | 331.25 | 710.5 | 1421 |
| DD(43) | 337.25 | 716.5 | 1433 |
| EE(44) | 343.25 | 722.5 | 1445 |
| FF(45) | 349.25 | 728.5 | 1457 |
| GG(46) | 355.25 | 734.4 | 1469 |
| HH(47) | 361.25 | 740.5 | 1481 |
| II(48) | 367.25 | 746.5 | 1493 |
| JJ(49) | 373.25 | 752.5 | 1505 |
| KK(50) | 379.25 | 758.5 | 1517 |
| LL(51) | 385.25 | 764.5 | 1529 |
| MM(52) | 391.25 | 770.5 | 1541 |
| NN(53) | 397.25 | 776.5 | 1553 |

Referring now to frequency convector circuitry 96 shown in FIG. 2, conductor 138 couples a feeder line tap 140 of the transmission cable network to the input of a filter 142. Filter 142 receives the broad band signal transmitted over the transmission cable network and filters out all but the video carrier portion (55.25 Megahertz to 397.25 Megahertz) of the broad band signal. The output of filter 142 is coupled to a first input of first mixer circuit 144. A second input of first mixer circuit 144 is coupled to line 132 for receiving the frequency signal synthesized by voltage controlled oscillator 130 of frequency synthesizer circuit 94. First mixer circuit 144 mixes the signals received at its first and second inputs, and the resulting difference frequency signal is coupled to the input of intermediate frequency amplifier 146.

Frequency synthesizer circuit 94 is programmed (via selection of the N value) such that the difference frequency provided by first mixer circuit 144 is always equal to 379.25 Megahertz for the video carrier of the particular channel which the subscriber has selected to receive. The resulting intermediate frequency signal is amplified by amplifier 146, and the amplified output signal is coupled to a first input of second mixer circuit 148. The second input of second mixer circuit 148 is coupled to common line 150 for receiving a fixed frequency 434.5 Megahertz signal generated by the multiple subscriber controller in a manner to be described below. Second mixer circuit 148 mixes the signals received at its first and second inputs and generates a resulting difference frequency signal having a frequency of 55.25 Megahertz for the particular channel selected by the subscriber.

The resulting difference frequency signal provided by second mixer circuit 148 is coupled to the input of amplifier 152, the output of which is coupled to the input of filter 154. Filter 154 is tuned to 55.25 Megahertz so as to maximize passage of the converted frequency signal corresponding to the original video carrier of the particular channel selected by the subscriber. Filter 154 is also designed to match the impedance of the output of frequency converter 96 to the 75 ohm characteristic impedance of subscriber drop cable 44.

Components 142, 144, 146, 148, 152 and 154 of frequency converter circuit 96 may be implemented by a 54-channel converter assembly commercially available from Standard Kollman Industries, Inc. of Melrose Park, Ill. The output of filter 154 is coupled by a 0.001 microfarad capacitor within coupling box 100 to subscriber drop cable 44 in order to transmit to code translator box 46 the 55.25 Megahertz converted frequency signal corresponding to the channel selected by the subscriber. In this manner, all video carrier frequencies carried by the transmission cable network are transmitted over the subscriber's drop cable 44 at a relatively low frequency within the VHF band. Accordingly, signal losses which would otherwise result within the subscriber drop cable at higher frequencies are eliminated. The subscriber's television receiver is always tuned to a low VHF channel, typically channel 2, while channel selection is controlled by the subscriber via his hand-held terminal 58. By reducing signal losses in the drop cables, the length of such cables can be extended, thereby decreasing the number of distribution points along the transmission cable network.

As indicated in FIG. 2, channel selection circuitry 92 is repeated up to 16 times for servicing up to 16 different subscribers. The channel selection circuitry 92 associated with each subscriber is coupled to one of the 16 ports extending from feeder line tap 140 of the transmission cable network. Each of the 16 channel selection circuits 92 receives power from its associated subscriber via the drop cable 44 extending therebetween. In the preferred embodiment of the present invention, all 16 channel selection circuits 92 are contained within a single multiple subscriber controller box. In this manner, the sixteen associated subscribers share a common point of distribution of television signals as well as sharing a common controller processing circuitry.

Still referring to FIG. 2, the multiple subscriber controller includes a power supply 156 having an input coupled by low pass inductor 158 to feeder line tap 140 of the transmission cable network for receiving the 60 volt/60 Hertz power signal carried thereby. Power supply 156 rectifies and filters the alternating current input power signal to provide a regulated positive voltage supply for powering the other components within the multiple subscriber controller.

Line 160 couples feeder line tap 140 of the transmission cable network to the input of a splitter amplifier 162. A first output of splitter amplifier 162 is coupled to the input of a filter 164, the function of which is to extract the clocking signal transmitted from the head end of the transmission cable network from the broad band signal transmitted thereover. In the preferred embodiment of the present invention, the clocking signal transmitted from the head end of the transmission cable network has a frequency of approximately 60 Megahertz. The output of filter 164 is coupled to the input of a clock divider circuit 166 which is responsive to the clocking signal extracted by filter 164 in order to provide a first clock output signal on line 168 and a second clock output signal on line 170. The first clock output signal is a 4 Megahertz frequency signal used to clock microprocessing unit 174. The second clock output signal conducted by line 170 is a 500 Kilohertz reference frequency signal coupled to common line 124 for use by the phase detector circuit 122 within each of the sixteen frequency synthesizer circuits. Line 170 is also coupled to the input of a frequency synthesizer circuit 172 which generates a fixed synthesized frequency signal of 434.5 Megahertz for coupling to common line 150. The circuitry within synthesizer 172 is similar to that already described within frequency synthesizer circuit 94 with the exception that the frequency divider therein is always programmed to divide by 869 rather than being programmable.

Still referring to FIG. 2, the multiple subscriber controller includes a microprocessing unit (MPU) 174 which functions to control reception of television channel signals by each of the sixteen subscribers with which it is associated. MPU 174 may be of the type commercially available from Motorola, Inc. under designated part No. MC6801. MPU 174 is adpated to operate upon eight bit data words and is adapted to provide a sixteen-bit output address. The eight-bit bidirectional data port of MPU 174 is coupled by lines 176 to data bus 118. Similarly, the sixteen-bit address port of MPU 174 is coupled by lines 178 to address bus 116. MPU 176 is also coupled to lines 168 for receiving the first clock output signal from clock divider circuit 166. In some cable television transmission networks, it may not be possible to transmit a master clocking signal from the head end due to limitations on the number of signals to be transmitted over the cable; in this event, MPU174 may be of the type which includes an internal clock oscillator, such as the MC6802 commercially available from Motorola, Inc.

Associated with MPU 174 is a read only memory (ROM) 180 and a random access memory (RAM) 182, each of which is organized to store eight-bit words. The address ports of ROM 180 and RAM 182 are each coupled to address bus 116. The data output port of ROM 180 and the bidirectional data port of RAM 182 are each coupled to data bus 118. MPU 174 fetches instruction words from ROM 180 in order to determine the sequence of operations to be performed by MPU 174. In addition, ROM 180 is used to store lookup table information as described in further detail below. Alternatively, some or all of this information may be stored within a read-only memory provided within the MC6801 chip. RAM 182, in addition to providing a stack and scratch-pad type register for MPU 174, serves as storage for authorization signals and preauthorization signals transmitted from the head end of the cable transmission network for each of the sixteen subscribers controlled by the particular multiple subscriber controller. The authorization signals and preauthorization signals stored by RAM 182 are used to determine which of the numerous television channel signals carried by the transmission cable network may be received by each of the sixteen subscribers associated with the particular multiple subscriber controller. In the preferred embodiment of the present invention, ROM 180 may consist of one or more integrated circuits of the type commercially available from Motorola, Inc. under designated part No. MCM6830. Similarly, RAM 182 preferably consists of a plurality of integrated circuits of the type commercially available from Motorola, Inc. under designated part No. MCM6810. Though not shown, the multiple subscriber controller may include batteries for providing standby power to RAM 182 in the event that power transmission over the cable transmission network is temporarily interrupted.

As mentioned above, an encoder/transmitter 6 at the head end of the cable transmission network generates authorization signals and preauthorization signals in a serial, encoded manner for transmission over the cable television network. In the preferred embodiment of the present invention, the authorization and preauthorization signals are transmitted as a serial bit stream in the form of a frequency shift keyed modulation of a 104 Megahertz command carrier. A phase locked loop receiver circuit 184 has its data input coupled to the second output of splitter amplifier 162 for receiving the broad band signal. Phase locked loop receiver 184 is tuned to 104 Megahertz for selecting the command carrier out of the broad band signal and is responsive to frequency shifts of the command carrier for recreating the serial bit stream used to modulate the command carrier. Phase-locked loop receiver 184 may be of the general type described within Application Note 5/78 AEG-Telefunken Corp., "Designing FM Tuners With TDA1062 and TDA1093 I.C.s". A reference frequency is supplied to phase-locked loop receiver 184 in order to lock onto the 104 Megahertz signal, the reference frequency being derived either from the transmission cable network or from a local crystal oscillator.

The serial output of phase-locked loop receiver 184 is coupled to the input of serial to parallel interface circuit 186 which may be of the type commercially available from Motorola, Inc. under designated part No. MC6850. Interface circuit 186 converts the serial bit stream into eight-bit data words. Interface circuit 186 has an address port coupled to address bus 116 and an eight-bit data port coupled to data bus 118. Interface circuit 186 also provides an output which may be used to signal MPU 174 (by generating an interrupt therein) that it has received an eight bit data word. When addressed, interface circuit 186 drives the eight-bit data word onto data bus 118 for transmission to MPU 174.

Each authorization and preauthorization signal includes an address portion consisting of one or more eight-bit words for uniquely addressing each of the subscribers serviced by the cable transmission network. The number of eight-bit address words within the address portion of each authorization or preauthorization signal is directly related to the total number of subscribers. For each authorization signal, the address portion is followed by at least one eight-bit data portion which is used to indicate the level of service to which the addressed subscriber is entitled to receive. In one embodiment of the present invention, seven different levels of service are provided to subscribers as indicated by a "1" bit in one of the seven least significant bit positions of the data portion of the authorization signal. However, since each eight bit data portion may have one of 256 different bit patterns, the authorization signal can specify as many as 256 different levels of service for each subscriber. As authorization signals are received by interface circuit 186, MPU 174 compares the address portion of each authorization signal to the sixteen unique addresses assigned to the sixteen subscribers associated therewith. In the event that the address portion of the authorization signal corresponds to one of the addresses assigned to its associated subscribers, MPU 174 causes the eight-bit data portion of the authorization signal to be stored in one of sixteen eight-bit storage locations within RAM 182, the particular one of the storage locations corresponding to the particular one of the sixteen subscribers that was addressed by the head end.

As mentioned above, cable television networks are sometimes used to televise special features and one-time events, such as boxing matches, for which the operator of the cable television network may require that a premium be paid by each of the subscribers who wish to receive the special feature in addition to the level of service which they have already paid to receive. In this event, the operator of the cable television network would ideally wish to prevent all subscribers from accessing the particular channel being used to televise the special feature until immediately before coverage of the special feature begins, at which time subscribers who have paid a premium for receiving the special feature would be simultaneously allowed to access the particular channel. If a large number of subscribers have paid such a premium to receive the special feature, it would not be practical to separately address each of these subscribers immediately before transmission of the special feature begins since the total amount of time to uniquely address each of these subscribers from the head end would be extensive.

Accordingly, another feature of the present invention relates to the transmission of preauthorization signals from the head end of the cable television network to the plurality of multiple subscriber controllers long in advance of the transmission of the special feature; a master strobe signal is transmitted from the head end immediately prior to the transmission of the special feature for simultaneously allowing each of the preauthorized subscribers to receive the special feature. In one embodiment of the present invention, the preauthorization signal merely consists of the most significant bit within the data portion of the conventional authorization signals described above. Thus, seven of the eight bits within the data portion of an authorization signal are used to determine the level of service to which the subscriber is normally entitled, while the eighth bit is normally reset. In the event that a particular subscriber has paid a premium to receive a special feature, the head end transmits a new authorization signal for the particular subscriber wherein the data portion there has the eighth bit set rather than reset. These new authorization signals (or preauthorization signals) may be transmitted over the cable television network hours or even days before the special feature is televised. Immediately prior to transmission of the special feature, the head end transmits a single predetermined address (e.g., a multi-byte address wherein all bits are equal to logic "1") to which each of the microprocessing units within each of the multiple subscriber controllers is responsive. Upon recognizing receipt of the predetermined address (or master strobe signal), each multiple subscriber controller sets a flag indicating that the master strobe signal was received. When a subscriber attempts to access the channel used to transmit the special feature, the associated multiple subscriber controller first checks the flag to determine whether the master strobe signal has been received. If so, the controller then examines the most significant bit of the stored data portion of the authorization signal to determine whether the requesting subscriber was preauthorized to receive the special feature.

Figure 3B:
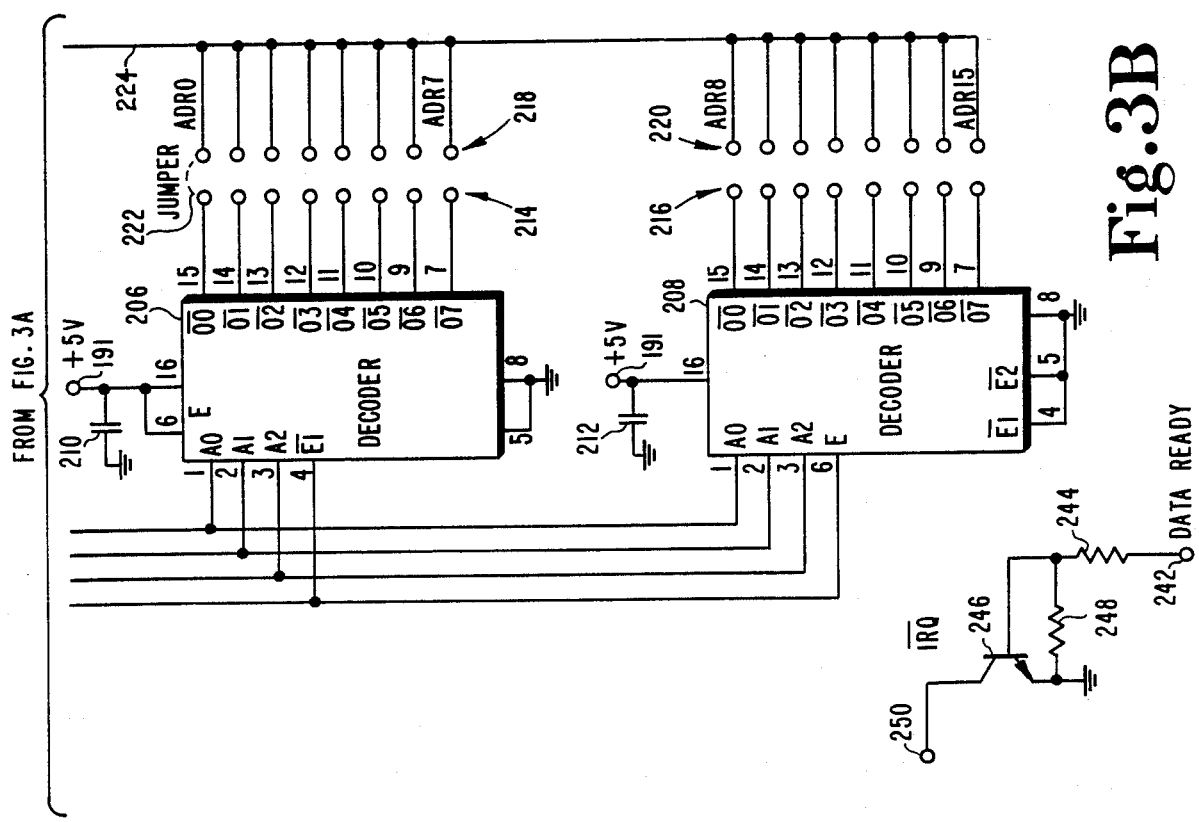
FIGS. 3A and 3B comprise a block diagram of circuitry used to interface a multiple subscriber controller to each of its associated subscribers.
Figure 3A:
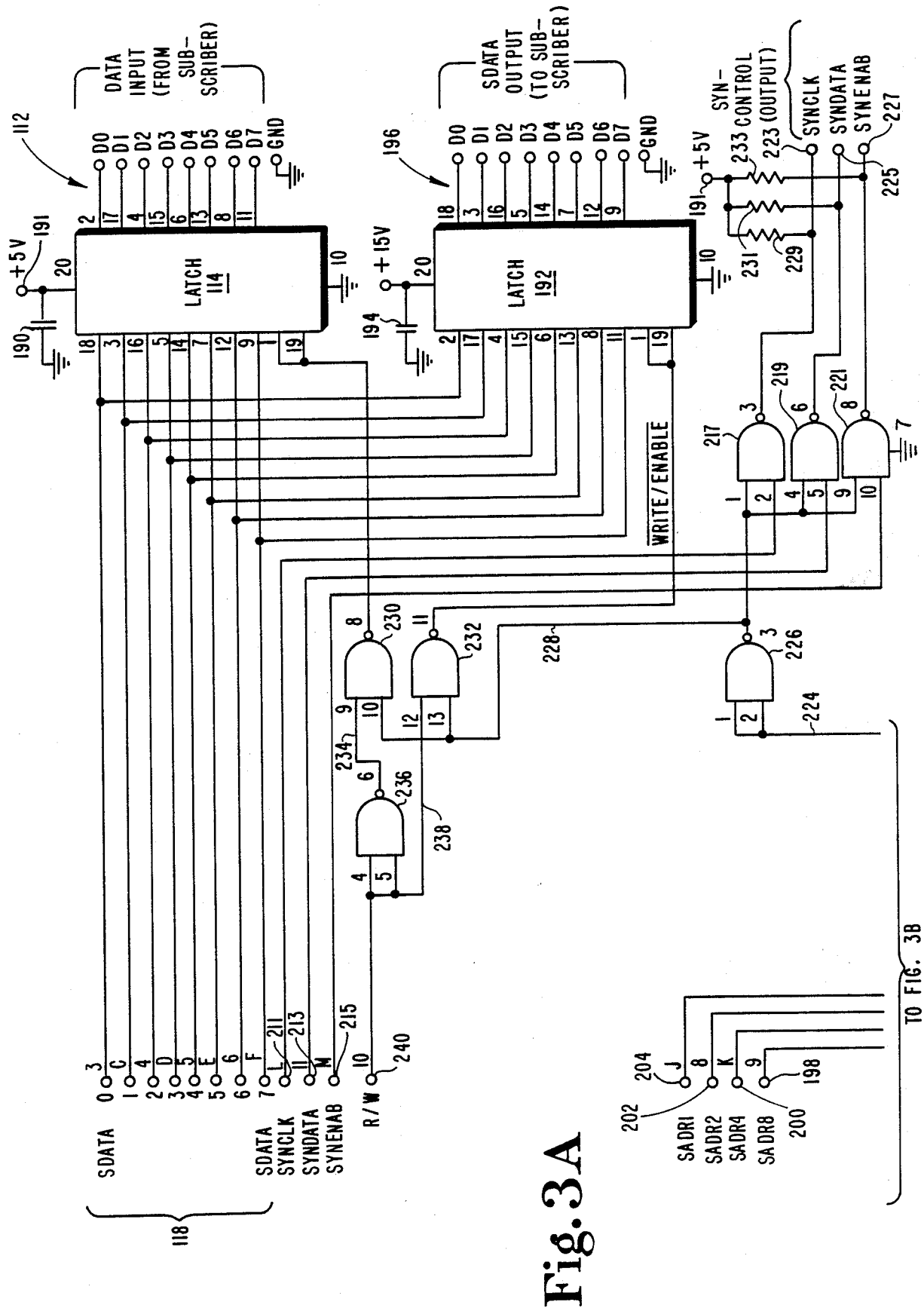

FIGS. 3A and 3B illustrate in further detail the manner in which the multiple subscriber controller interfaces with each of the sixteen associated channel selection circuit blocks for each of the associated sixteen subscribers. Interface memory register 120 is omitted from FIGS. 3A and 3B, but it will be understood that interface memory register 120 for each subscriber is coupled to data bus 118 as shown in FIG. 2. Interface latch 114 has eight input lines designated 112 for receiving two four-bit binary coded decimal digits corresponding to the channel selected by the subscriber. Interface latch 114 may be of the type commercially available under part designation SN74LS244N, and pin numbers corresponding to such part type are shown adjacent the lines coupled thereto. Pin 10 of latch chip 114 is coupled to ground while pin 20 is coupled to a positive 5 volt supply terminal 191. A decoupling capacitor 190 is coupled between ground and pin 20 of latch chip 114 for decoupling any noise present on the positive supply voltage pin. The eight output terminals of latch chip 114 are coupled to the eight-bit data bus 118 (SDATA 7–SDATA 0) of the multiple subscriber controller. The output terminals of latch chip 114 are of the tri-state type wherein the output terminals assume a high impedance unless latch chip 114 is enabled. Pins 1 and 19 of latch chip 114 are normally at a logic "1" or high level for maintaining the storage locations latched and for maintaining the output terminals of latch chip 114 in the high impedance mode. When pins 1 and 19 are pulled to a low level or logic "0", latch chip 114 is enabled for taking note of the status of input lines 112 and for enabling the output terminals of latch chip 114 to actively drive data bus lines 118. A second latch chip 192 may also be provided in the event that an echo-back mode of operation is desired whereby the multiple subscriber controller echoes back the requested channel to the subscriber. Further details concerning this echo-back mode of operation are described below. Latch chip 192 is also preferably part type SN74LS244N, and has its eight data input pins coupled to eight-bit data bus 118. Pin 10 of latch chip 192 is grounded while pin 20 of latch chip 192 is coupled to the 5 volt positive supply terminal 191. Decoupling capacitor 194 is coupled at one of its ends to pin 20 of latch chp 192 and is coupled at its opposite end to ground. The eight output terminals of latch chip 192 are coupled to eight lines designated 196 described in further detail below. As in the case of latch chip 114, pins 1 and 19 of latch chip 192 are normally at a high level or logic "1" for maintaining latch chip 192 in the latched mode. When pins 1 and 19 of latch chip 192 are pulled to a low level or logic "0", then latch 192 takes note of the status of the data on data bus 118 and output lines 196 are actively driven in accordance therewith.

As mentioned above, each multiple subscriber controller is used to control the channel selection circuitry associated with sixteen different subscribers. In order to individually address each of the sixteen different channel selection circuits associated with the sixteen different subscribers, the channel selection circuitry for each subscriber includes four addressing terminals 198, 200, 202, and 204 designated SADR8, SADR4, SADR2 and SADR1, respectively. Addressing terminals 198–204 are coupled to a pair of decoder chips which, in the preferred embodiment of the present invention, are of the type commercially available under part designation SN74LS138N. Each of decoder chips 206 and 208 has three address inputs (A2, A1, and A0) as well as an active high enable input (E) and a pair of active low enable inputs ($\overline{E1}$ and $\overline{E2}$). The least significant addressing terminal 204 is coupled to the A0 inputs of decoder chips 206 and 208. Similarly, addressing input terminals 202 and 200 are coupled to the A1 and A2 inputs of decoder chips 206 and 208. Most significant addressing input terminal 198 is coupled to the active low enable input $\overline{E1}$ of decoder chip 206 and to active high enable input E of decoder chip 208. Active high enable input E and active low enable input $\overline{E2}$ of decoder chip 206 are coupled to positive supply terminal 191 and ground, respectively. Pin 16 and pin 8 of decoder chip 206 are also coupled to positive supply terminal 191 and ground, respectively, for powering decoder chip 206. A decoupling capacitor 210 is coupled from positive supply pin 16 of decoder chip 206 to ground. Active low enable inputs $\overline{E1}$ and $\overline{E2}$ of decoder chip 208 are grounded. Pin 16 and pin 8 of decoder chip 208 are coupled to positive supply terminal 191 and ground, respectively, for supplying power to decoder chip 208. A decoupling capacitor 212 is coupled from the positive supply pin of decoder chip 208 to ground.

Decoder chips 206 and 208 each include eight active low outputs. Assuming that SADR8 input terminal 198 is a low level, decoder chip 206 is enabled while decoder chip 208 is disabled. Accordingly, one of the eight output terminals of decoder chip 206 will be low in accordance with the SADR4, SADR2, SADR1 addressing signals received at terminals 200, 202, 204, respectively while all of the output terminals of decoder chip 208 are inactive at a high level. Conversely, if SADR8 input terminal 198 is at a high level, then decoder chip 206 is disabled while decoder chip 208 is enabled. Accordingly, one of the eight output terminals of decoder chip 208 will be at an active low level in accordance with the SADR4, SADR2 and SADR1 addressing signals received by terminals 200, 202, and 204, respectively, while all of the output terminals of decoder chip 206 are inactive at a high level.

Disposed adjacent output terminals 214 are a corresponding plurality of terminals 218 designated ADR-7-ADR0. Similarly, disposed adjacent output terminals 216 of decoder chip 208 are a corresponding plurality of terminals 220 designated ADR15-ADR8. Within the channel selection circuitry for each of the sixteen subscribers, an electrically conductive jumper such as that designated by dashed line 222, is connected between one of the sixteen decoder chip output terminals and the terminals 218 or 220 disposed adjacent thereto. The jumper for each subscriber is connected to a different one of the sixteen decoder chip output terminals so that no two subscribers are addressed at any one time.

The plurality of terminals 218 and the plurality of terminals 220 are all coupled to a common address enable line 224 which is active low. Line 224 is in turn coupled to both inputs of a two input NAND gate 226. The output of NAND gate 226 is coupled by line 228 to a first input of NAND gate 230 and to the first input of NAND gate 232. The second input of NAND gate 230 is coupled by line 234 to the output of NAND gate 236. The first and second inputs of NAND gate 236 are coupled by line 238 to the second input of NAND gate 232. The first and second inputs of NAND gate 236 are also coupled to read/write terminal 240. NAND gates 226, 230, 232, and 236 may all be provided by a single integrated circuit type SN74LS00N.

Read/write terminal 240 is controlled by MPU 174 of the multiple subscriber controller and is at a high level or logic "1" when MPU 174 writes data onto data bus 118 while being at a low level or logic "0" when a device other than MPU 174 is to write data onto data bus 118. Assuming that addressing input signals SADR-8-SADR1 received by terminals 198-204 correspond to the address of the particular subscriber circuitry shown in FIGS. 3A/3B, then line 228 is at a high level or logic "1". If read/write input terminal 240 is at a high level or logic "1" then the output of NAND gate 230 is at a high level or logic "1" while the output of NAND gate 232 is at a low level or logic "0". Accordingly, data written onto data bus 118 by MPU 174 is entered into latch chip 192. Conversely, if read/write input terminal 240 is at a low level or logic "0", then the output of NAND gate is a low level or logic "0" while the output of NAND gate 232 is a high level or logic "1". In this event, latch chip 114 is enabled for taking note of the data present on input lines 112 and for driving data bus 118 in accordance therewith. Still referring to FIG. 3A, synchronization signals are received from MPU 174 by input terminals 211 (SYNCLK), 213 (SYNDATA), and 215 (SYNENAB) for synchronizing the operation of channel selection circuitry 92 for each subscriber with MPU 174. Input terminals 211, 213, and 215 are coupled to a first input of NAND gates 217, 219, and 221, respectively. NAND gates 217, 219, and 221 may all be provided by an additional integrated circuit type SN74LS08N. A second input of each NAND gate 217, 219 and 221 is coupled to the output of NAND gate 226 for receiving an address enable signal which is active (at a high level) when a corresponding subscriber has been addressed. The outputs of NAND gates 217, 219, and 221 are coupled to output terminals 223 (SYNCLK), 225 (SYNDATA), and 227 (SYNENAB), respectively. In addition, the outputs of NAND gates 217, 219, and 221 are coupled by pull-up load resistors 229, 231, and 233, respectively, to positive voltage supply terminal 191. The SYNCLK, SYNDATA, and SYNENAB synchronization signals provided by MPU 174 are gated with the address enable signal for each subscriber in order to cause channel selection circuitry 92 to be reprogrammed only when the subscriber has requested a new channel.

Also shown in FIG. 3B is circuitry used to indicate to the multiple subscriber controller that a subscriber has made a channel selection request. Data ready input terminal 242 is coupled to a DATA READY output terminal (not shown) of ultrasonic receiver chip 108 shown in FIG. 2. The DATA READY output is provided by pin 17 for part type MC14458 which generates a positive pulse after a complete two digit command is received from the remote ultrasonic transmitter. DATA READY input terminal 242 is coupled by resistor 244 to the base of NPN transistor 246, and resistor 248 is coupled from the base of transmistor 246 to ground. The emitter of transistor 246 is coupled to ground while the collector of transistor 246 is coupled to interrupt request terminal 250 ($\overline{IRQ}$).

When DATA READY terminal 242 receives a positive going pulse from the DATA READY output of the ultrasonic receiver chip 108, transistor 246 becomes conductive and draws collector current. The channel selection circuitry of each of the sixteen different subscribers has an $\overline{IRQ}$ terminal 250, and all sixteen $\overline{IRQ}$ terminals are coupled in common to one end of a pull-up resistor (not shown), the opposite end of which is coupled to the positive supply voltage. Hence, when transistor 246 becomes conductive within any one of the sixteen channel selection circuits associated with the sixteen different subscribers, current is conducted through the common pull-up resistor, and $\overline{IRQ}$ terminals 250 are pulled low. $\overline{IRQ}$ terminals 250 are coupled to an active low interrupt request input terminal of MPU 174 for causing an interrupt in normal program execution in order to service the channel selection request made by one of the subscribers. As noted in the description above, MPU 174 is also interrupted when authorization and/or preauthorization signals are transmitted from the head end. Priority is given to interrupts caused by transmission of authorization signals and/or preauthorization signals from the head end over interrrupts caused by subscriber channel requests in order that information from the head end not be lost. Such priority may be achieved, for example, by coupling $\overline{IRQ}$ terminals 250 to a maskable interrupt request terminal of MPU 174 and coupling an interrupt request terminal of serial-to-parallel interface 186 to a non-maskable interrupt request terminal of MPU 174.

Figure 4:
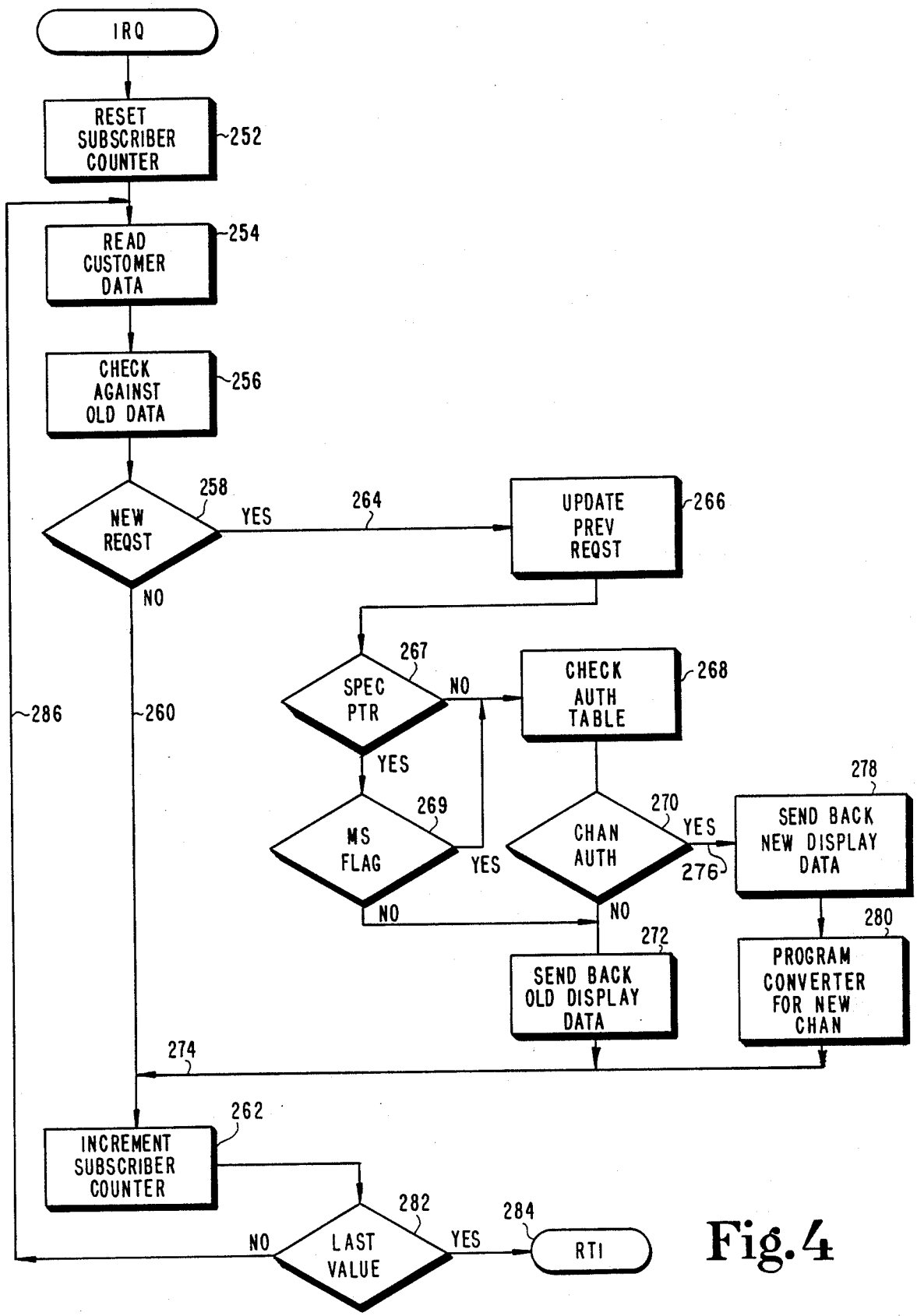
FIG. 4 is a flow chart diagram of the steps performed by the multiple subscriber controller when one of its associated subscribers requests access to a new channel.

The flow chart diagram shown in FIG. 4 illustrates the steps performed by MPU 174 within the multiple subscriber controller whenever an interrupt request is generated due to a channel selection request made by one of the associated subscribers. As indicated by box 252, a subscriber counter maintained within RAM 182 is initially reset to zero for designating a first of the sixteen subscribers. Subsequently, the subscriber counter is incremented until it eventually reached fifteen for designating the sixteenth of the sixteen subscribers.

The first step within the repetitive loop portion of the interrupt subroutine is represented by box 254 wherein MPU 174 accesses the subscriber counter and uses the contents thereof as an index for addressing a table of sixteen eight-bit storage locations within RAM 182 which are used to store (in binary coded decimal format) the two-digit channel last requested by each of the sixteen subscribers. After obtaining the content of the addressed storage location from RAM 182, MPU 174 enables latch chip 114 of the particular subscriber referenced by the subscriber counter for examining the status of input lines 112 coupled to latch chip 114. In order to enable latch chip 114, addressing signals SADR-8–SADR1 are configured in accordance with the status of the subscriber counter. Read/write input terminal 240 is driven to a low level for causing pins 1 and 19 of latch chip 114 for the addressed subscriber to assume the active low level state.

MPU 174 compares the channel selection information received from latch chip 114 with the channel last selected by the subscriber, the comparison step being indicated by diamond-shaped box 258. If the value received from latch chip 114 is identical to the value previously stored in RAM 182, the the subscriber has not made a new channel request and program control proceeds via line 260 to box 262 wherein the subscriber counter is incremented. On the other hand, if the value received from latch chip 114 is not the same as the value previously stored within the previous channel request table in RAM 182, then program control proceeds via line 264 to box 226 wherein the new channel selection value is caused to be written into the previous channel request table in RAM 182.

The next step performed by MPU 174 is to determine whether the channel requested by the subscriber is one used to broadcast special features. This step is represented by diamond-shaped box 267. If so, MPU 174 checks the status of the master strobe signal flag to determine whether the master strobe signal has already been received. This step is represented by diamond-shaped box 269. If not, program control proceeds to box 272; if so, then program control proceeds to box 268 to determine whether the subscriber has been preauthorized to receive the special feature. On the other hand, if the channel requested by the subscriber is not one used to transmit special features, then control proceeds to box 268.

Assuming that the subscriber has requested a channel not used to transmit special features, or that the subscriber has requested a special features channel and the master strobe signal has been received, the next step performed by MPU 174 is to determine whether the new channel requested by the subscriber is one which he is authorized (or preauthorized) to receive. In one embodiment of the present invention, this determination is made by using the two-digit (eight-bit) channel request value to index a look up table of eight bit words stored in ROM 180. The respective eight-bit word read from ROM 180 is temporarily stored within MPU 174. MPU 174 then addresses RAM 182 and the data portion of the authorization signal corresponding to the subscriber making the request. The bits within the data portion of the authorization signal are then logically ANDed with the eight-bit word obtained from the look-up table within ROM 180. These steps are represented within FIG. 4 by box 268.

Program control then proceeds to diamond-shaped box 270 where it is determined whether or not the result of the above mentioned logical AND operation is equal to zero or not. If the result is zero, then the subscriber is not authorized to receive the channel which he has requested and program control proceeds to box 272. In this event, neither the contents of latch chip 192 nor the contents of interface memory register 120 (see FIG. 2) are altered. Accordingly, the subscriber continues to receive the channel which he had previously been receiving. Program control then proceeds from box 272 via line 274 to box 262.

On the other hand, if the result of the logical AND operation does not have a zero result, then the requested channel is one which the subscriber is authorized to receive, and program control proceeds via line 276 to box 278. In this event, MPU 174 causes the newly selected two-digit channel value to be written into latch chip 192. MPU 174 then uses the two-digit channel selection value as an index for addressing a look-up table within ROM 180 in order to acquire an N value for programming the subscriber's frequency converter. The N value look-up table includes two eight-bit locations for each channel transmitted by the cable television network. The values stored in the N value look up table are shown in Table 1 above. MPU 174 initially accesses the first of the addressed pair of eight bit storage locations and causes the contents thereof to be stored within the least significant byte of interface memory register 120. MPU 174 then accesses the second of the pair of storage locations within the look up table and causes its contents to be stored in the most significant byte of interface memory register 120. The new N value is then transmitted over lines 136 to the programmable divider 134 for synthesizing a new frequency, allowing the subscriber to receive the channel which he has requested. These steps are designated by box 280 in FIG. 4. Program control then proceeds via line 274 to box 262.

At box 262, the subscriber counter is incremented. Program control then proceeds to diamond-shaped box 282 for determining whether or not all sixteen subscribers have been polled. When the subscriber counter has been incremented to the digital value sixteen, then all sixteen subscribers have been polled, and program control is returned from the interrupt sequence to the main program as designated by line 284. However, if not all sixteen subscribers have been polled, then the interrupt sequence proceeds via line 286 to box 254, and the loop is repeated.

The main program is essentially a wait loop wherein MPU 174 awaits interruptions caused either by serial-to-parallel interface chip 186 (for detecting the receipt of authorization signal, preauthorization signals, and master strobe signals from the end end) or by the $\overline{IRQ}$ line (for detecting a subscriber channel selection request).

FIGS. 5-7 illustrate the format of authorization signals, preauthorization signals, and the master strobe signal used within an alternate embodiment of the present invention. As shown in FIG. 5, each authorization signal, preauthorization signal and master strobe signal consists of a four-byte (32 bit) control word preceded by a start mark bit and followed by a stop mark bit. As shown in FIG. 6, Byte 1 and Byte 2 form the least significant byte and most significant byte, respectively, of a sixteen bit multiple subscriber controller address for addressing one of the multiple subscriber controllers associated with the cable television network. As described earlier, each multiple subscriber controller is responsive to a particular address which uniquely identifies each multiple subscriber controller. Byte 1 and Byte 2 allow the cable television network to address in excess of 65,000 multiple subscriber controllers, each of which services up to sixteen different subscribers. In addition, all of the multiple subscriber controllers are simultaneously responsive to a particular address which corresponds to a master strobe signal.

Before discussing in detail the function of Byte 3 and Byte 4 of the control word, the manner in which authorization signals and preauthorization signals are stored by the multiple subscriber controller in response to such control words will now be described. For each subscriber, a primary (authorization) table and a secondary (preauthorization) table are formed within RAM 182 (see FIG. 2). Each primary and secondary table includes a plurality of storage locations or elements equal in number to the number of television channels which can be broadcast over the cable television network. Channel authorization information is stored within the primary table for each subscriber for determining whether or not the particular subscriber may receive a requested channel. For example, the fifth element of the primary table for a particular subscriber might contain a zero number or a non-zero number, according to whether or not the subscriber is authorized to receive channel 5. Similarly, the 6th and 7th elements of the primary table may each be either zero or non-zero for indicating whether the subscruber is authorized to receive channel 6 and channel 7, respectively. Each time that a subscriber requests a new channel, the requested channel number is used to index a corresponding element within the primary table associated with the requesting subscriber, and the indexed element is then examined to determine whether it is zero or non-zero, and hence whether the subscriber is authorized to receive the requested channel.

Like the primary table, the secondary table is of a length equal to the number of channels transmitted by the cable television network. Preauthorization signals transmitted from the head end are stored in the secondary table for specifying whether the subscriber has been preauthorized to receive each of the channels. Upon receipt of the master strobe signal, each multiple subscriber controller is programmed to transfer the information stored within the secondary table to the primary table for each of its sixteen subscribers. Accordingly, new channel requests made by subscribers after the transmission of the master strobe signal are allowed or disallowed based upon the preauthorization signals previously transmitted to the associated multiple subscriber controller for each of its subscribers.

Referring to FIG. 7, Byte 3 and Byte 4 each include eight bits identified 0-7. Bits 0-3 of Byte 3 form a four-bit subscriber address for specifying one of the sixteen subscribers controlled by the particular multiple subscriber controller addressed by Byte 1 and Byte 2. Bits 0-3 of Byte 3 thereby correspond to a subscriber pointer used to point to one of the sixteen primary or secondary tables stored within RAM 182. Bits 4 and 5 of Byte 3 are spares for allowing for expansion of the control word. Bit 6 of Byte 3 is an authorization switch used to indicate whether a particular element within code or a non-authorization code. If the authorization switch is a logical "0", then the element within the primary or secondary table for an addressed subscriber will be loaded with a non-authorization code (for example, the number zero). On the other hand, if the authorization switch is a logical "1", then the element within the primary or secondary table of the addressed subscriber is loaded with an authorized code (for example, a number not equal to zero).

Bit 7 of Byte 3 is designated as a strobe bit and is a logic "1" only when Byte 1 and Byte 2 correspond to the master strobe signal address. In this event, bits 0-6 of Byte 3 and bits 0-7 of Byte 4 are all equal to logic "0". As mentioned above, upon the occurrence of the master strobe signal, the contents of the secondary table for each subscriber are transferred to the corresponding primary table.

Bits 0-5 of Byte 4 form a six-bit table element address for indexing one of as many as sixty-four elements within either the primary or secondary table for the subscriber addressed by bits 0-3 of Byte 3. Bit 6 of Byte 4 is a check bit and should always be a logic "0". If the check bit is detected to be a logic "1", then the data in Byte 3 and Byte 4 is considered non-valid, and neither the primary or secondary table is modified. Bit 7 of Byte 4 is a primary/secondary table selector switch. If bit 7 of byte 4 is a logic "0", then the table element address indexes an element of the primary table, which element is then loaded with an authorization code or a non-authorization code, as determined by the authorization switch. On the other hand, if bit 7 of Byte 4 is a logic "1", then the table element address indexes an element of the secondary table, which element is then loaded with an authorization code or non-authorization code, as determined by the authorization switch.

In an alternate embodiment of the present invention, an echo-back mode of operation is effected whereby the channel displayed by display 46 within the subscriber's code translator 46 indicates the channel actually being received by the subscriber as opposed to the channel that may have been requested by the subscriber. In this alternate embodiment, the data inputs of decoder driver chip 84 within code translator 46 (see FIG. 2) are not coupled directly to the latched output terminals of receiver chip 72. Instead, the data inputs of decoder driver chip 84 are coupled to the data output terminals of a first universal asynchronous receiver/transmitter chip or UART (not shown) provided within code translator 46. The first UART chip has a data input capacitively coupled within coupling box 90 to subscriber drop cable 44 for receiving a frequency modulated bit stream centered at approximately 100 Kilohertz indicating the two-digit channel number of the frequency converted video carrier being provided to the subscriber. A second UART chip (not shown) is provided within interface circuit block 98 of channel selection circuitry 92, and the serial data output of the second UART chip is capacitivity coupled within coupling box 100 to subscriber drop cable 44 for transmitting the two-digit channel number as a frequency modulated bit stream to the first UART chip. The parallel eight-bit data inputs of the second UART chip are coupled to output lines 196 of latch chip 192 (see FIG. 3A). Whenever latch chip 192 is enabled for receiving a new two-digit channel number, the second UART chip is activated for transmitting the new channel number to the first UART chip. The new channel number is then displayed by the subscriber's display 86 within his code translator box 46.

In this manner, display 86 always indicates the channel actually being received by the subscriber. Assuming that the subscriber has requested a channel for which he is not authorized to receive, display 86 will reflect the channel which he was previously receiving, rather than the unauthorized channel, due to the full duplex mode of operation. Similarly, if an error occurs in the transmission of the requested channel from the subscriber's code translator to the remote channel selection circuitry 92, then display 96 will reflect the channel which the multiple subscriber controller has programmed for the subscriber to receiver, rather than the channel the subscriber selected.

In an alternate embodiment, the echo-back feature is achieved by replacing the above mentioned first and second UARTs with ultrasonic receiver and transmitter circuits, respectively, similar to MC14458 receiver 72 and MC14457 transmitter 62. The transmitter is located within interface circuit block 98 and receives row and column information from MPU 174, which information is obtained from a look up table in ROM 180. The output of the transmitter is capacitively coupled within coupling box 100 to drop cable 44. The receiver is located within code translator 46 and its input is capacitivity coupled within coupling box 90 to drop cable 44; the eight-bit output of the receiver is coupled to the input terminals of decoder driver chip 84.

It will now be appreciated that an addressable cable television system has been described wherein a plurality of multiple subscriber controllers are coupled to the cable television network, each multiple subscriber controller functioning to control the reception of television signals by a plurality of subscribers. Multiple levels of service are provided by uniquely addressing each subscriber with an authorization signal that determines the level of service to which each particular subscriber is to receive. The use of preauthorization signals in conjunction with a master strobe signal allows the cable television network operator to simultaneously enable a large number of subscribers to gain access to a premium television channel. The security of the present cable television network is greatly increased by removing the frequency converter circuitry from the home of the subscriber. Nonetheless, the power drain on the transmission cable is minimized by powering the frequency converter circuitry from the subscriber's home over the subscriber drop cable. Furthermore, by converting all television signals that are transmitted over the subscriber drop cable to a single low frequency within the VHF wave band, signal losses within the subscriber drop cable are minimized, thereby allowing longer drop cables and fewer distribution points along the cable.

While the present invention has been described with reference to a preferred embodiment thereof, the description is for illustrative purposes only and is not to be construed as limiting the scope of the invention. Various modifications and changes may be made by those skilled in the art without departing from the true spirit and scope of the invention as defined by the appended claims.

We claim:

1. A cable television system for distributing a plurality of different television channel signals to a plurality of subscribers, each subscriber having access only to those television channel signals which such subscriber has been authorized to receive, said cable television system comprising in combination:

a. transmission cable means for transmitting the plurality of different television channel signals, said transmission cable means having a head end for generating the plurality of different television channel signals transmitted by said transmission cable means;

b. authorization means coupled to the head end of said transmission cable means for generating authorization signals transmitted by said transmission cable means, the authorization signals including an address portion for identifying a particular subscriber ana data portion for indicating which television channel signals the particular subscriber has been authorized to receive;

c. subscriber selection means operated by each subscriber for generating a selection request signal indicating which television channel signal the subscriber desires to receive;

d. a plurality of multiple subscriber controllers coupled to said transmission cable means, each of said controllers controlling reception of television channel signals by a particular plurality of subscribers, each of said controllers storing the data portion of authorization signals having an address portion that identifies one of the particular subscribers controlled by each controller, each of said controllers being coupled to said subscriber selection means of each of the subscribers for which it control reception for receiving the selection request signal therefrom, and each of said controllers comparing the selection request signals received from the plurality of subscribers stored data portions of corresponding authorization signals for determining whether each respective subscriber may received the television channel signal desired by the subscriber, each said controller including a preprogrammed memory means for storing a lookup table of predetermined N values each corresponding to a particular selection request signal; and e. a plurality of controller selection means associated with each of said controllers, each of said controller selection means 1. being coupled between said transmission cable means and one of the particular plurality of subscribers for which reception is controlled by each associated controller, at a location remove from its associated subscriber;

2. coupling one of the plurality of television channel signals to the associated subscriber as determined by the selection request signal and stored data portion corresponding to the associated subscriber; and 3. having a separate frequency-synthesized local oscillator including a continuously closed phase-locked loop, said phase-locked loop including a programmable divider and register means for storing an N value for programming said programmable divider, wherein said controller further includes conditional logic means for supplying a particular N value from said lookup table to the register means associated with a particular subscriber if the particular subscriber is authorized to receive the television channel signal desired, and for otherwise enabling the particular subscriber's controller selection means to couple an alternate television channel signal to the particular subscriber, said conditional logic means including means for accessing a memory location in said preprogrammed memory means which is determined by a selection request signal.

2. A cable television system as recited in claim 1 wherein each of said plurality of controller selection means is a frequency converter circuit for converting the select television channel signal to a predetermined frequency for subsequent transmission to the associated subscriber.

3. A cable television system as recited in claim 2 wherein said predetermined frequency is a relatively low frequency in the V.H.F. wave band.

4. A cable television system as recited in claim 1 further including drop cable means for coupling each of said controller selection means to its associated subscriber.

5. A cable television system as recited in claim 4 wherein each controller and its associated plurality of controller selection means are disposed at a single location.

6. A cable television system as recited in claim 4 wherein said cable means includes coaxial cable for transmission of a composite video and audio television signal, wherein each of said plurality of controller selection means receives electrical power from its associated subscriber, said electrical power being transmitted on the same coaxial cable used for transmission of the composite television channel signal.

7. A cable television system as recited in claim 1 wherein each of said plurality of controllers and each of said controller selection means includes a clock terminal for receiving a clock pulse, said cable television system further including:

f. means coupled to the head end of said transmission cable means for generating a clock signal transmitted by said transmission cable means; and g. clock signal receiving means associated with each of said controllers, each said clock signal receiving means having an input coupled to said transmission cable means for receiving said clock signal and having output means coupled to the clock terminal of each associated controller and coupled to the clock terminals of each of said associated controller selection means for providing clock pulses thereto.

8. A cable television system as recited in claim 1 wherein each of said controllers includes:

1. first storage means for storing selection request signals received from each of its associated subscribers;

2. second storage means for storing selection request signals for each of its associated subscribers corresponding to a television channel signal currently being accessed by each associated subscriber;

3. each said controller comparing the contents stored by said first storage means to the contents stored by said second storage means for detecting that a subscriber has requested access to a television channel signal different from the television channel signal currently being accessed by such subscriber.

9. A cable television system as recited in claim 8 wherein each of said controllers includes means for transferring the contents of said first storage means to said second storage means upon detecting a request by a subscriber for access to a different television channel signal and upon determining that the subscriber is authorized to receive the newly requested television channel signal.

10. A cable television system as recited in claim 9 further including channel display means associated with each subscriber for indicating which television channel signal is currently being accessed by each subscriber, said channel display means being coupled to said second storage means for displaying the contents thereof.

11. A cable television system as recited in claim 8 wherein each of said subscriber selection means generates a data ready signal upon actuation of said subscriber selection means by the subscriber, and wherein each of said controllers includes interrupt means responsive to the data ready signals generated by said subscriber selection means associated therewith for indicating that one of the subscribers associated with each said controller has requested access to a different television channel signal.

* * * * *

UNITED STATES PATENT AND TRADEMARK OFFICE
CERTIFICATE OF CORRECTION

PATENT NO. : 4,823,386

DATED : April 18, 1989

INVENTOR(S) : Lewis D. Dumbauld et al.

It is certified that error appears in the above-identified patent and that said Letters Patent is hereby corrected as shown below:

On the cover page, block 63, last line, and in column 1, line 9, please change "250,215" to --250,214--.

In column 1, line 35, please change "b" to --but--.

In column 2, line 1, please insert a period before "Accordingly".

In column 2, line 8, please insert a period after "receiver".

In column 3, line 42, please change "associate" to --associated--.

In column 4, line 66, please insert --6-- after "transmitter".

In column 6, line 42, please change "Motolola" to --Motorola--.

In column 6, line 66, please insert --58.-- after "terminal".

In column 7, line 1, please change "ultrasonci" to --ultrasonic--.

In column 7, line 3, please change "ypte" to --type--.

In column 7, line 11, please insert a hyphen between "five" and "bit".

UNITED STATES PATENT AND TRADEMARK OFFICE
CERTIFICATE OF CORRECTION

PATENT NO. : 4,823,386

DATED : April 18, 1989

INVENTOR(S) : Lewis D. Dumbauld et al.

It is certified that error appears in the above-identified patent and that said Letters Patent is hereby corrected as shown below:

In column 8, line 7, please insert --50-- after "lines".
In column 8, line 19, please insert --)-- after "shown".
In column 8, line 38, please delete "g".
In column 9, line 67, please change "12" to --122--.
In column 10, line 14, please insert a hyphen between "eleven" and "bit".
In column 11, line 26, please change "convector" to --converter--.
In column 15, line 31, please change "arc" to --are--.
In column 15, line 37, please change "there" to --thereof--.
In column 16, line 33, please change "chp" to --chip--.
In column 16, line 66, please insert a period after "208".
In column 18, line 44, please change "transmistor" to --transistor--.
In column 19, lines 2 and 3, please change "interrrupts" to --interrupts--.
In column 19, line 27, please change "content" to --contents--.
In column 20, line 8, please insert a hyphen after "look".
In column 20, line 8, please insert a hyphen after "eight".

UNITED STATES PATENT AND TRADEMARK OFFICE
CERTIFICATE OF CORRECTION

PATENT NO. : 4,823,386
DATED : April 18, 1989
INVENTOR(S) : Lewis D. Dumbauld et al.

It is certified that error appears in the above-identified patent and that said Letters Patent is hereby corrected as shown below:

In column 20, line 43, please insert a hyphen after "look".
In column 20, line 45, please insert a hyphen after "eight".
In column 21, line 49, please change "subcruber" to --subscriber--.
In column 22, line 15, after "within" please insert --a primary or secondary table is to contain an authorization--.
In column 23, line 5, please change "capacitivity" to --capacitively--.
In column 23, line 27, please change "receiver" to --receive--.
In column 23, line 40, please change "capacitivity" to --capacitively--.
In column 24, line 27, please change "ana" to --and a--.
In column 24, lines 44 and 45, please change "control" to --controls--.
In column 24, line 48, after "subscribers" please insert --for which it controls reception to the corresponding--.
In column 24, line 62, please change "remove" to --remote--.

UNITED STATES PATENT AND TRADEMARK OFFICE
CERTIFICATE OF CORRECTION

PATENT NO. : 4,823,386

DATED : April 18, 1989

INVENTOR(S) : Lewis D. Dumbauld et al

It is certified that error appears in the above-identified patent and that said Letters Patent is hereby corrected as shown below:

In column 25, line 24, please change "select" to --selected--.

Signed and Sealed this

Sixteenth Day of January, 1990

*Attest:*

JEFFREY M. SAMUELS

*Attesting Officer*   *Acting Commissioner of Patents and Trademarks*